J. W. LINGG.
MEDALS.

No. 184,289.  Patented Nov. 14, 1876.

Witnesses  Inventor
Saml J. Van Stavoren  Joseph W. Lingg,
Jos. C. Connolly  By Connolly Bros, Attorneys

UNITED STATES PATENT OFFICE.

JOSEPH W. LINGG, OF PHILADELPHIA, PENNSYLVANIA.

IMPROVEMENT IN MEDALS.

Specification forming part of Letters Patent No. 184,289, dated November 14, 1876; application filed March 25, 1876.

*To all whom it may concern:*

Be it known that I, JOSEPH W. LINGG, of Philadelphia, in the county of Philadelphia and State of Pennsylvania, have invented a certain new and useful Mode of Attaching Glass to Medals; and do hereby declare the following to be a full, clear, and exact description of the invention, such as will enable others skilled in the art to which it pertains to make and use it, reference being had to the accompanying drawings, which form part of this specification, in which—

Figure 1:
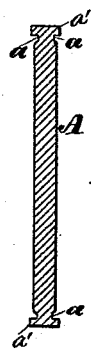
Figure 2:
Figure 3:
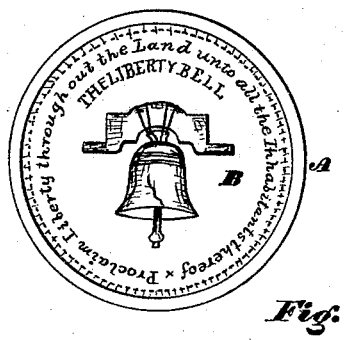

Figure 1 is a vertical transverse section of the medal. Fig. 2 is a vertical transverse section of the medal and glass cases or faces. Fig. 3 is a plan view of my invention.

The object of my invention is to provide a new method of applying glass to medals for the purpose of protecting the face or faces of the same from injury by contact.

My improvements contemplate the application of glass for the purpose indicated without the employment of a bezel or band for holding the same.

In carrying my invention into effect I form an annular groove on the face of the medal near the edge. Such groove may be formed in the die when the medal is being cut or stamped, or it may be cut by a suitable plowing-tool mounted on a lathe after the medal comes from the stamping-die. I now apply the glass (which may be a watch-crystal of appropriate size) to the medal, in such manner that its periphery will enter and rest in the groove aforesaid. I now turn down the metal outside the groove, in such manner that it will bind and clamp the turned-over edge of the glass, holding the latter fixedly in place. If the medal have two faces, each face will be covered with glass in the manner described.

Referring to the accompanying drawing, A shows a metallic medal of any appropriate size and design. *a* shows an annular groove formed therein by any suitable means, as by pressing, stamping, or plowing, such groove being formed on each of the two sides of the medal. B B are glasses, having their peripheries inserted in the grooves *a a*, the metal *a'* outside of the glasses being turned in by any suitable mechanical means against the turned-down edges *b* of said glasses, so as to securely clamp and bind the same.

The advantages of this construction are its simplicity and cheapness; also, a glass thus applied is more secure than one fitted with a band, and less likely to admit dust around its edges than the latter.

What I claim as my invention is—

As a new article of manufacture, a medal having glass applied to one or both its sides, the edge of the glass being inserted in an annular groove in the medal, and the metal outside turned against such edge, substantially as shown and described.

In testimony that I claim the foregoing I have hereunto set my hand this 22d day of March, 1876.

JOSEPH W. LINGG.

Witnesses:
M. DANL. CONNOLLY,
CHAS F. VAN HORN.